CaF$_2$-ThF$_4$-RF$_3$
COMPOSITION DIAGRAM

RELATIVE EFFICIENCY vs CaF$_2$/ThF$_4$

Inventors:
James F. Sarver
Ralph A. Hewes
by *Richard H. Burgess*
Their Attorney RELATIVE EFFICIENCY VS $Yb^{3+}$ CONCENTRATION

IR-EXCITED EMISSION SPECTRA

Inventors:
James F. Sarver
Ralph A. Hewes
by Richard H. Burgess
Their Attorney

United States Patent Office 3,580,860
Patented May 25, 1971

3,580,860
INFRARED-EXCITABLE ALKALINE EARTH THORIUM FLUORIDE LUMINESCENT MATERIALS
James F. Sarver, Lyndhurst, and Ralph A. Hewes, Cleveland Heights, Ohio, assignors to General Electric Company
Filed May 2, 1969, Ser. No. 831,807
Int. Cl. C09k 1/06
U.S. Cl. 252—301.1
13 Claims

ABSTRACT OF THE DISCLOSURE

The invention relates to alkaline earth thorium fluoride materials activated with ytterbium and erbium. The materials respond to infrared excitation and produce visible light.

CROSS-REFERENCES TO RELATED APPLICATIONS

A specific application suitable for the luminescent materials of the present invention is described in detail in copending application Ser. No. 716,897 filed Mar. 28, 1968 in the names of Ralph M. Potter and Simeon V. Galginaitis, assigned to the assignee of the present invention. That application in certain embodiments involves the use of a doped gallium arsenide infrared-emitting diode coated with phosphor which can be a phosphor of the present invention. The infrared radiation emitted by the diode and the excitation spectrum of the phosphor interact as a combination to produce green light.

BACKGROUND OF THE INVENTION

This invention relates to luminescent material. More particularly, the invention relates to alkaline earth thorium fluoride activated with the rare earth elements ytterbium and erbium, which can be excited to produce visible radiation by infrared stimulation.

In 1852, Stokes noted that fluorescent light was usually less refrangible (had longer wavelengths) than the excited light. The proposition that longer wavelength light could not normally be used to generate short wavelength light in phosphors became known as Stokes Law, and the few phosphors which were exceptions to this law were eventually known as anti-Stokes phosphors. Since infrared light is beyond the long-wavelength end of the visible spectrum, any light-emitting phosphors stimulable by infrared excitation alone would be anti-Stokes phosphors. Until our recent work, no such infrared-stimulable phosphors have been known to be sufficiently efficient for the production of visible light in commercially feasible devices.

Essentially all previous commercial applications of phosphors for the production of visible light by photo-luminescent excitation utilize ultraviolet or, in some cases, visible light excitation. Such ultraviolet or visible exciting electric discharges in arcs.

Incandescent lamps, on the other hand, produce light by heating a filament to incandescent temperatures at which substantial amounts of visible light are emitted. However, large amounts of the input energy used to heat the filament to incandescence are dissipated as infrared light also produced by the incandescent filament. It would be very desirable to have an efficient phosphor which could convert such infrared light to visible light, thereby supplementing the visible light portion of the output of an incandescent lamp and utilizing the otherwise wasted infrared emission.

Other light sources can be made to emit primarily infrared light and are useful with infrared-excitable phosphors, including such devices as the gallium arsenide light-emitting diode disclosed and claimed in the above-identified application of Potter and Galginaitis.

It would be desirable to have a phosphor which could be excited by such infrared emission to produce light within the visible spectrum, but the few previously known infrared-stimulable anti-Stokes phosphors have not been sufficiently efficient to allow the production of a practical commercial product.

There are various scientific reasons why the light emitted by a phosphor is normally at longer wavelengths than the exciting light. Considered from the standpoint of electronic energy levels, after photoexcitation by light of a certain wavelength, there is some nonradiative energy decay or relaxation before the light-emitting transition back down to the ground stated energy level, due to interaction of the activator with the lattice. Thus, the light emission comes from a smaller energy transition and is therefore of longer wavelength than the excitation. However, one anti-Stokes luminescent mechanism involves the use of double excitation. A quantum of light excites an electron up to one level, and then another quantum of light excites the same electron to a higher energy level. From this higher energy level, the electron can relax somewhat to a slightly lower level, and from there go through a transition back to the original ground state, thus producing light equivalent to an energy transition greater than the initial energy input but less than the total energy input from the two quanta. Being a higher energy transition than either of the input quanta, the emitted light has a shorter wavelength than the average wavelength of the exciting light. The two input quanta, of course, could either be of the same wavelength or of different wavelengths.

Such infrared-stimulable phosphors have been used in the past in infrared quantum counters. Phosphors that can produce longer wavelength light from shorter wavelength excitation have been shown to include: ZnCdS:Ag:Cu by R. M. Potter, J. Electrochem. Soc., 106, 58 C (1959), producing green light with orange and infrared excitation at room temperature; and $LaCl_3:Pr^{3+}$ by John F. Porter, Jr., Phys. Rev. Letters, 7, 414 (1961). Other phosphors useful for such purposes have been shown to include: $Na_{0.5}Yb_{0.49}Er_{0.01}WO_4$ by F. Auzel, Compt. Rend., 262 B, 1016 (1966); $CaWO_4:Er$; and $(Ca,Ba)F_2:(Tm, Er, Ho)Yb$; however, none of these phosphors were sufficiently bright to be usable commercially for the production of visible radiation by utilizing infrared radiation.

SUMMARY OF THE INVENTION

It is an object of the present invention to provide an efficient infrared-stimulable, visible light-emitting luminescent material. A further object is to provide such material which is efficient enough for utilization in commercial lamps for the production of visible light.

Briefly stated, the invention relates to an alkaline earth thorium fluoride luminescent material activated with ytterbium and erbium and having the following generic formula:

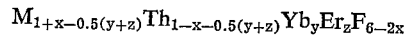

$$M_{1+x-0.5(y+z)}Th_{1-x-0.5(y+z)}Yb_yEr_zF_{6-2x}$$

where M is an alkaline earth metal selected from the group consisting of calcium, strontium and barium, $x$ has a value from 0.18 to negative 0.06 (—0.06), $y$ has a value of 0.16 to 0.32 and $z$ has a value from 0.002 to 0.20. Of course, when $x$ has a negative value more than 6 atoms of fluorine will be present. This formula provides charge compensation in the composition. Preferably, $x$ has a value from 0.03 to 0.09, $y$ has a value from 0.18 to 0.24, and $z$ has a value from 0.03 to 0.05. In these materials according to the invention Yb and Er are trivalent. The luminescent material responds to infrared excitation and produces a visible light.

Those parts of our invention which are considered to be new are set forth in detail in the claims appended hereto. The invention, however, may be better understood and further objects and advantages thereof appreciated from a consideration of the drawings and the following detailed description.

BRIEF DESCRIPTION OF THE DRAWINGS

FIG. 4 is an infrared emission spectrum of

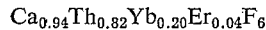

$$Ca_{0.94}Th_{0.82}Yb_{0.20}Er_{0.04}F_6$$

compared with $La_{0.86}Yb_{0.12}Er_{0.02}F_3$.

DESCRIPTION OF THE PREFERRED EMBODIMENTS

Figure 1:
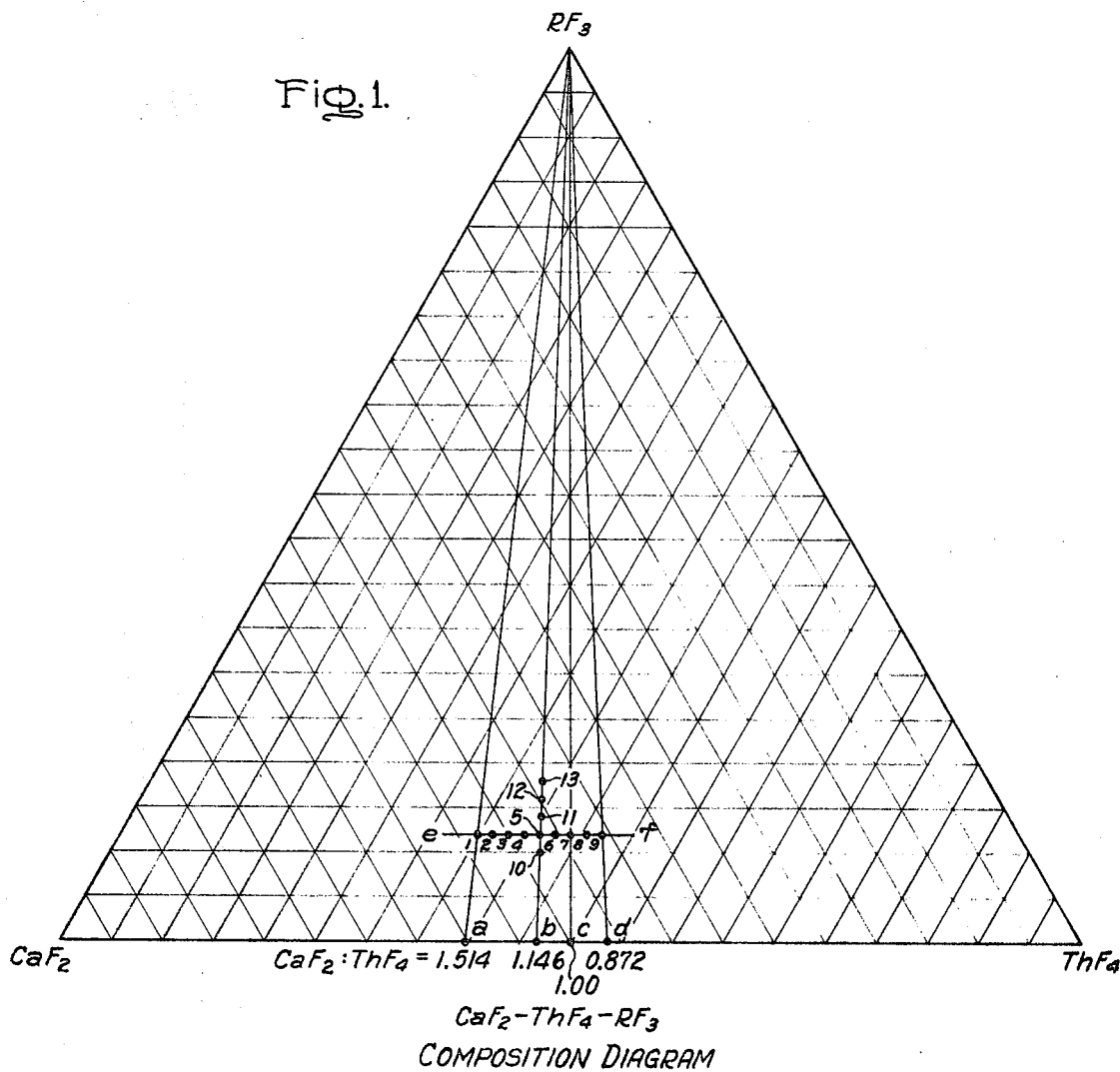
FIG. 1 is a composition diagram for CaThF$_6$:YbEr type phosphors.

Referring more particularly to FIG. 1, the compositions are plotted on ternary coordinates and are located on line $ef$, and on the line between the point $b$ and the RF$_4$ apex, where R represents a combination of the two two rare earth elements Yb and Er in which Er is held constant at 2 molar percent of the total cations present in the composition. For the optimization of the CaF$_2$:ThF$_4$ ratio, compositions were formulated so as to maintain 2.00 equivalent moles of cations as in the stoichiometric compound CaThF$_6$ or as in Ca$_{0.88}$Th$_{0.88}$Yb$_{0.20}$Er$_{0.04}$F$_6$. With the Yb$^{3+}$ and Er$^{3+}$ concentrations held constant, the phosphor cationic formulation was varied at regular intervals from Ca$_{1.06}$Th$_{0.70}$Yb$_{0.20}$Er$_{0.04}$ to

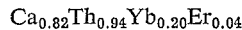

$$Ca_{0.82}Th_{0.94}Yb_{0.20}Er_{0.04}$$

The compositions are summarized in Table II hereinafter referred to.

Figure 2:
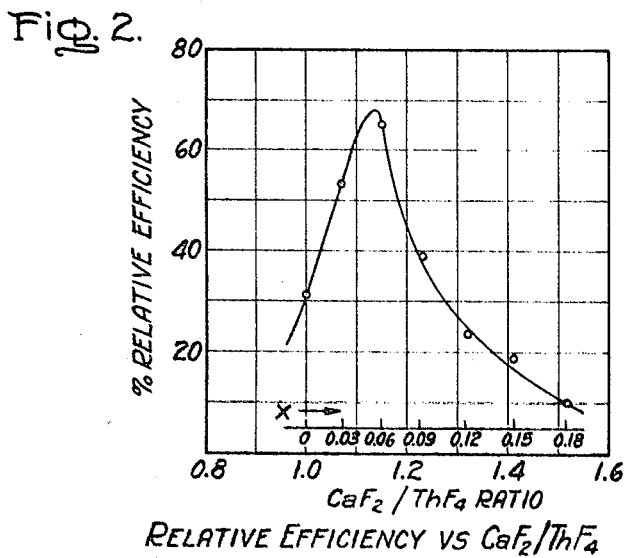
FIG. 2 is a graph of relative efficiencies versus CaF$_2$:ThF$_4$ ratio.

Referring more particularly to FIG. 2, it can be seen that optimum CaF$_2$:ThF$_4$ ratio occurs at about 1.10 to 1.15. The values of $x$ from the formula discussed above are given in FIG. 2 along with the ratio of CaF$_2$:ThF$_2$. Phosphors were then prepared with a CaF$_2$:ThF$_4$ ratio of 1.146, a constant Er$^{3+}$ concentration of 2.0 mole percent and Yb$^{3+}$ concentrations of from 8.0 to 16.0 mole percent.

As an example, composition No. 1 in FIG. 1 contains on a molar percentages basis 53% CaF$_2$, 35% ThF$_4$ and 12% RF$_3$. Expressed by chemical formula this can be written as Ca$_{0.53}$Th$_{0.35}$R$_{0.12}$F$_{2.82}$ or Ca$_{1.06}$Th$_{0.70}$R$_{0.24}$F$_{5.64}$. The latter expression is in the same terms as used in Table II.

Figure 3:
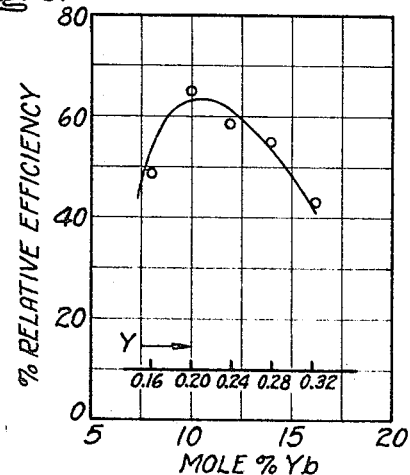
FIG. 3 is a graph of relative efficiency versus Yb$^{3+}$ concentration.

With further reference to FIG. 3, the graph depicts relative infrared efficiency of phosphors where there is a variation of Yb$^{3+}$ concentration. The values of $y$ from the formula discussed above are given along with the mole percent of Yb. The relative efficiency of the phosphors is shown in the last column of Table III, referred to hereinafter.

The infrared excited emission spectrum of

Figure 4:
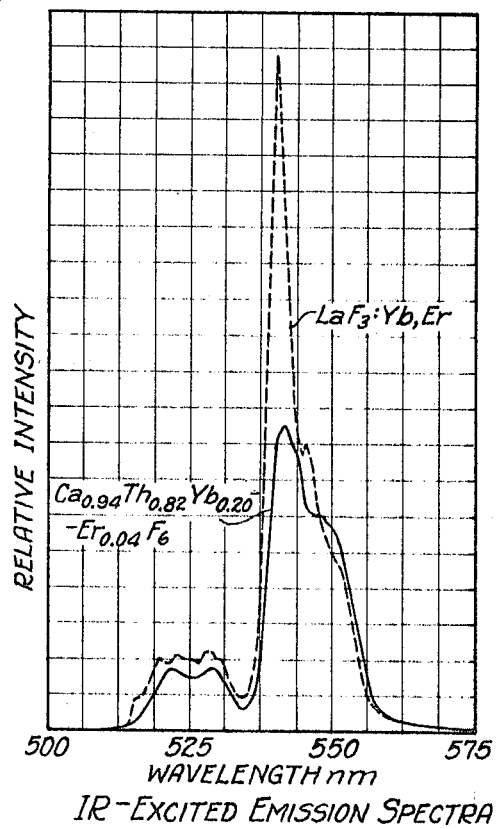

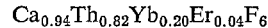

$$Ca_{0.94}Th_{0.82}Yb_{0.20}Er_{0.04}F_6$$

referred to in Table III as Sample No. 5, is shown in FIG. 4, compared with that of $La_{0.86}Yb_{0.12}Er_{0.02}F_3$ of the prior art.

Specific examples of the phosphor formulations in grams used in the preparation of the phosphor compositions are recited in Table I as follows:

TABLE I.—BATCH INGREDIENTS

| Sample No. | Phosphor formulation (grams) | | | |
|---|---|---|---|---|
| | CaCO$_3$ | Th(C$_2$O$_x$)$_2$.XH$_2$O [1] | Yb$_2$O$_3$ | Er$_2$O$_3$ |
| 1 | 3.1829 | 9.3683 | 1.1822 | 0.2294 |
| 2 | 3.0928 | 9.7698 | 1.1822 | 0.2294 |
| 3 | 3.0027 | 10.1713 | 1.1822 | 0.2294 |
| 4 | 2.9126 | 10.5728 | 1.1822 | 0.2294 |
| 5 | 2.8225 | 10.9743 | 1.1822 | 0.2294 |
| 6 | 2.7325 | 11.3758 | 1.1822 | 0.2294 |
| 7 | 2.6424 | 11.7773 | 1.1822 | 0.2294 |
| 8 | 2.5523 | 12.1788 | 1.1822 | 0.2294 |
| 9 | 2.4622 | 12.5803 | 1.1822 | 0.2294 |
| 10 | 2.8886 | 11.2152 | 0.9458 | 0.2294 |
| 11 | 2.7565 | 10.7334 | 1.4187 | 0.2294 |
| 12 | 2.6934 | 10.4791 | 1.6551 | 0.2294 |
| 13 | 2.6274 | 10.2382 | 1.8916 | 0.2294 |

[1] Thorium oxalate; 59.17% thorium as ThO$_2$.

Other alkaline-earth metals such as strontium and barium may be substituted for calcium in the above examples. The resultant phosphors respond to infrared excitation analogous to LaF$_3$:Yb Er and are isostructural with LaF$_3$ according to Keller and Salzer, J. Inorg. Nucl. Chem. 29, pp. 2925–2934 (1967).

The above compositions were prepared by mixing in acetone in an agate mortar the designated quantities of calcium carbonate, thorium oxalate, and Yb$_2$O$_3$ and Er$_2$O$_3$. The mixed constituents were fired in air at 800° C. to decompose the oxalate and were remixed in acetone, followed by firing in anhydrous HF at 925° C. for one hour. The resultant materials were well-rystallized fluorides as determined by powder X-ray techniques. For CaF$_2$:ThF$_4$ ratios less than 1.0, the samples melted. There is apparently an eutectic below 925° C. between CaThF$_6$ and ThF$_4$.

The phosphor formulation of each sample, e.g. composition, is given in Tables II and III below:

TABLE II.—Composition and relative infrared excited efficiency of CaThF$_6$:Yb,Er-type phosphors; variation of CaF$_2$:ThF$_4$ ratio with constant Yb$^{3+}$ and Er$^{3+}$ concentrations

| Sample No. | Moles | | | | CaF$_2$:ThF$_4$ ratio | Phosphor formulation | Relative efficiency,[1] percent |
|---|---|---|---|---|---|---|---|
| | CaF$_2$ | ThF$_4$ | YbF$_3$ | ErF$_3$ | | | |
| 1 | 1.06 | 0.70 | 0.20 | 0.04 | 1.514 | Ca$_{1.06}$Th$_{0.70}$Yb$_{0.20}$Er$_{0.04}$F$_{5.64}$ | 10 |
| 2 | 1.03 | 0.73 | 0.20 | 0.04 | 1.411 | Ca$_{1.03}$Th$_{0.73}$Yb$_{0.20}$Er$_{0.04}$F$_{5.70}$ | 19 |
| 3 | 1.00 | 0.76 | 0.20 | 0.04 | 1.316 | Ca$_{1.00}$Th$_{0.76}$Yb$_{0.20}$Er$_{0.04}$F$_{5.76}$ | 24 |
| 4 | 0.97 | 0.79 | 0.20 | 0.04 | 1.228 | Ca$_{0.97}$Th$_{0.79}$Yb$_{0.20}$Er$_{0.04}$F$_{5.82}$ | 39 |
| 5 | 0.94 | 0.82 | 0.20 | 0.04 | 1.146 | Ca$_{0.94}$Th$_{0.82}$Yb$_{0.20}$Er$_{0.04}$F$_{5.88}$ | 65 |
| 6 | 0.91 | 0.85 | 0.20 | 0.04 | 1.071 | Ca$_{0.91}$Th$_{0.85}$Yb$_{0.20}$Er$_{0.04}$F$_{5.94}$ | 53 |
| 7 | 0.88 | 0.88 | 0.20 | 0.04 | 1.000 | Ca$_{0.88}$Th$_{0.88}$Yb$_{0.20}$Er$_{0.04}$F$_{6.00}$ | 31 |
| 8 | 0.85 | 0.91 | 0.20 | 0.04 | 0.934 | Ca$_{0.85}$Th$_{0.91}$Yb$_{0.20}$Er$_{0.04}$F$_{6.06}$ | ([2]) |
| 9 | 0.82 | 0.94 | 0.20 | 0.04 | 0.872 | Ca$_{0.82}$Th$_{0.94}$Yb$_{0.20}$Er$_{0.04}$F$_{6.12}$ | ([2]) |

[1] Compared with $La_{0.98}Yb_{0.13}Er_{0.02}F_3$.
[2] Sample melted.

TABLE III.—Compositions and relative infrared excited efficiency of CaThF$_6$:Yb,Er-type phosphors; variation of Yb$^{3+}$ concentration with constant CaF$_2$:ThF$_4$ ratio and Er$^{3+}$ concentration

| Sample No. | Moles | | | | Yb$^{3+}$ conc., percent | Phosphor formulation | Relative efficiency, percent |
|---|---|---|---|---|---|---|---|
| | CaF$_2$ | ThF$_4$ | YbF$_3$ | ErF$_3$ | | | |
| 10 | 0.962 | 0.838 | 0.16 | 0.04 | 8.0 | Ca$_{0.962}$Th$_{0.838}$Yb$_{0.16}$Er$_{0.04}$F$_{5.876}$ | 49 |
| 11 | 0.918 | 0.802 | 0.24 | 0.04 | 12.0 | Ca$_{0.918}$Th$_{0.802}$Yb$_{0.24}$Er$_{0.04}$F$_{5.884}$ | 59 |
| 12 | 0.897 | 0.783 | 0.28 | 0.04 | 14.0 | Ca$_{0.897}$Th$_{0.783}$Yb$_{0.28}$Er$_{0.04}$F$_{5.886}$ | 55 |
| 13 | 0.875 | 0.765 | 0.32 | 0.04 | 16.0 | Ca$_{0.875}$Th$_{0.765}$Yb$_{0.32}$Er$_{0.04}$F$_{5.890}$ | 43 |
| 5 | 0.940 | 0.820 | 0.20 | 0.04 | 10.0 | Ca$_{0.940}$Th$_{0.820}$Yb$_{0.20}$Er$_{0.04}$F$_{5.880}$ | 65 |

Certain preferred embodiments are those represented by Samples 5, 6, 11, and 12, and are those having the highest relative efficiency as shown in Tables II and III.

As many widely different embodiments of this invention may be made without departing from the spirit and scope thereof, it is to be understood that this invention is not limited to the specific embodiments except as defined in the appended claims.

What is claimed as new and desired to be secured by Letters Patent of the United States is:

1. A luminescent material having the formula:

$$M_{1+x-0.5(y+z)}Th_{1-x-0.5(y+z)}Yb_yEr_zF_{6-2x}$$

wherein M is an alkaline earth metal selected from the group consisting of calcium, strontium and barium, $x$ has a value of 0.18 to $-0.06$, $y$ has a value of 0.16 to 0.32 and $z$ has a range of 0.002 to 0.20.

2. A luminescent material according to claim 1 in which $x$ has a value from 0.03 to 0.09.

3. A luminescent material according to claim 1 in which $y$ has a value from 0.18 to 0.24.

4. A luminescent material according to claim 1 in which $z$ has a value from 0.03 to 0.05.

5. A luminescent material according to claim 1 in which $x$ has a value from 0.03 to 0.09, $y$ has a value from 0.18 to 0.24, and $z$ has a value from 0.03 to 0.05.

6. A luminescent material according to claim 1 having essentially the composition:

$$Ca_{0.97}Th_{0.79}Yb_{0.20}Er_{0.04}F_{5.82}$$

7. A luminescent material according to claim 1 having essentially the composition:

$$Ca_{0.94}Th_{0.82}Yb_{0.20}Er_{0.04}F_{5.88}$$

8. A luminescent material according to claim 1 having essentially the composition:

$$Ca_{0.91}Th_{0.85}Yb_{0.20}Er_{0.04}F_{5.94}$$

9. A luminescent material according to claim 1 having essentially the composition:

$$Ca_{0.88}Th_{0.88}Yb_{0.20}Er_{0.04}F_{6.00}$$

10. A luminescent material according to claim 1 having essentially the composition:

$$Ca_{0.962}Th_{0.838}Yb_{0.16}Er_{0.04}F_{5.876}$$

11. A luminescent material according to claim 1 having essentially the composition:

$$Ca_{0.918}Th_{0.802}Yb_{0.24}Er_{0.04}F_{5.884}$$

12. A luminescent material according to claim 1 having essentially the composition:

$$Ca_{0.897}Th_{0.783}Yb_{0.28}Er_{0.04}F_{5.886}$$

13. A luminescent material according to claim 1 having essentially the composition:

$$Ca_{0.875}Th_{0.765}Yb_{0.32}Er_{0.04}F_{5.890}$$

References Cited
UNITED STATES PATENTS

| | | | |
|---|---|---|---|
| 2,979,467 | 4/1961 | Keller | 252—301.4S |
| 3,495,893 | 2/1970 | Geusic et al. | 252—301.4R |

ROBERT D. EDMUNDS, Primary Examiner

U.S. Cl. X.R.

252—301.4R